US007203672B2

(12) United States Patent
Cruanes et al.

(10) Patent No.: US 7,203,672 B2
(45) Date of Patent: Apr. 10, 2007

(54) COMMUNICATING EXTERNAL EXPRESSIONS USING A PARALLEL SINGLE CURSOR MODEL

(75) Inventors: Thierry Cruanes, Redwood City, CA (US); Bhaskar Ghosh, Burlingame, CA (US); Subramanian Muralidhar, Fremont, CA (US); William H. Waddington, Foster City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 351 days.

(21) Appl. No.: 10/865,178

(22) Filed: Jun. 9, 2004

(65) Prior Publication Data

US 2005/0131890 A1 Jun. 16, 2005

Related U.S. Application Data

(63) Continuation-in-part of application No. 10/841,991, filed on May 6, 2004, and a continuation-in-part of application No. 10/824,887, filed on Apr. 13, 2004.

(60) Provisional application No. 60/530,413, filed on Dec. 16, 2003.

(51) Int. Cl.
*G06F 17/30* (2006.01)
(52) U.S. Cl. .............................................. 707/2; 707/8
(58) Field of Classification Search ................... None
See application file for complete search history.

(56) References Cited

U.S. PATENT DOCUMENTS

| 5,325,525 | A | * | 6/1994 | Shan et al. ................. 718/104 |
| 5,765,146 | A | * | 6/1998 | Wolf et al. ..................... 707/2 |
| 6,081,801 | A | * | 6/2000 | Cochrane et al. ............... 707/3 |
| 7,051,034 | B1 | * | 5/2006 | Ghosh et al. ............... 707/100 |
| 2003/0055813 | A1 | * | 3/2003 | Chaudhuri et al. ............ 707/3 |
| 2005/0132383 | A1 | | 6/2005 | Ghosh et al. |

* cited by examiner

*Primary Examiner*—Christian Chace
*Assistant Examiner*—Thu-Nguyet Le
(74) *Attorney, Agent, or Firm*—Hickman Palermo Truong & Becker LLP; Brian D. Hickman

(57) ABSTRACT

Techniques are provided for processing, within a database server, a database statement, where at least one subtask required by the database statement is to be executed in parallel by a slave set. The database server determines whether the database statement includes an external expression, relative to the subtask, that (a) produces information that is required by slave processes in the slave set in order to perform the subtask, and (b) is not to be evaluated by each slave process in the slave set. During execution of the statement, if the database statement includes an external expression, then one or more external values are generated by causing the external expression to be evaluated, and the one or more external values are communicated to slaves of the slave set to allow the slave processes to perform respective portions of the subtask in parallel, without requiring each slave of the slave set to evaluate the external expression.

30 Claims, 2 Drawing Sheets

COMMUNICATING EXTERNAL EXPRESSIONS USING A PARALLEL SINGLE CURSOR MODEL

PRIORITY CLAIM/RELATED CASES

This application claims the benefit of priority from U.S. Provisional Application Ser. No. 60/530,413, entitled "Parallel Shared Cursors" filed Dec. 16, 2003, which is incorporated by reference in its entirety for all purposes as if fully set forth herein.

This application is a continuation-in-part of U.S. patent application Ser. No. 10/824,887, entitled "COMPILATION AND PROCESSING A PARALLEL SINGLE CURSOR MODEL", filed on Apr. 13, 2004, the contents of which are incorporated herein, in their entirety, for all purposes.

This application is a continuation-in-part of U.S. patent application Ser. No. 10/841,991, entitled "EXECUTING FILTER SUBQUERIES USING A PARALLEL SINGLE CURSOR MODEL", filed on May 6, 2004, the contents of which are incorporated herein, in their entirety, for all purposes.

This application is related to:

U.S. patent application Ser. No. 10/898,300, entitled "Dynamic Performance Views With A Parallel Single Cursor Model", filed on Jul. 23, 2004;

U.S. patent application Ser. No. 10/930,433, entitled "Executing Nested Subqueries of Parallel Table Functions in the Parallel Single Cursor Model", filed on Aug. 30. 2004;

U.S. patent application Ser. No. 10/901,411, entitled "Parallel Single Cursor Model on Multi-Server Configurations", filed on Jul. 27, 2004;

U.S. patent application Ser. No. 10/944,175, entitled "Executing A Parallel Single Cursor Model", filed on Sep. 16. 2004;

the contents of all of which are incorporated herein, in their entirety, for all purposes.

FIELD OF THE INVENTION

The present invention relates to managing data and, more specifically, to parallelizing operations that include external expressions.

BACKGROUND

Database applications interact with a database server by submitting to the database server commands that cause the database server to perform operations on data stored in a database. For the database server to process the commands, the commands must conform to a database language supported by the database server. One database language supported by many database servers is known as the Structured Query Language (SQL).

When a database server receives a database command from a database application, the database server must first determine which actions should be performed in response to the database command, and then perform those actions. The act of preparing for performance of those actions is generally referred to as "compiling" the database command, while performing those actions is generally referred to as "executing" the database command.

Various database languages, such as SQL, support special-purpose constructs referred to herein as "cursors". During the compilation of a query statement, the database server may perform a significant amount of preliminary work for the statement, such as parsing, semantic analysis, and query plan generation. A cursor stores the results of much of this preliminary work. For example, one set of information stored in a cursor includes the execution plan for performing the operations specified by the SQL statement.

One method of representing an execution plan is a row-source tree. At execution, traversal of a row-source tree from the bottom up yields a sequence of steps for performing the operation(s) specified by the SQL statement. A row-source tree is composed of row-sources. During the compilation process, row-sources are allocated, and each row-source is linked to zero, one, two, or more underlying row-sources. The makeup of a row-source tree depends on the query and the decisions made by a query optimizer during the compilation process. Typically, a row-source tree is comprised of multiple levels. At the lowest level, the leaf nodes access rows from a database or other data store. The top row-source, the root of the tree, produces the rows of the query that the tree implements. The intermediate levels perform various transformations on rows produced by underlying row-sources.

The row-source tree representation of execution plans is described in detail in U.S. Pat. No. 5,857,180, entitled "Method and apparatus for implementing parallel operations in a database management system", issued to Hallmark et al on Jan. 5, 1999, the entire contents of which are incorporated herein. Hallmark also describes a "row-source approach" for parallelizing the operations required by a SQL command by parallelizing portions of the execution plan of the query. The row-source approach to parallelizing queries is described in greater detail below.

Parallel Execution of a Query Using Slave SQL

Sequential query execution uses one processor and one storage device at a time. In contrast, parallel query execution uses multiple processes to execute, in parallel, suboperations of a query. For example, virtually every query execution includes some form of manipulation of rows in a relation, or table of the database management system (DBMS). Before any manipulation can be done, the rows must be read, or scanned. In a sequential scan, the table is scanned using one process. Parallel query systems provide the ability to break up the scan such that more than one process can get involved in performing the table scan.

Various techniques have been developed for parallelizing queries. Such techniques typically rely on an underlying query processing model. For example, one model (a "row-source model") for parallelizing queries is described, in U.S. Pat. No. 5,857,180, which was mentioned above. According to the row-source (iterator) model of SQL execution, data flows through the SQL operations modeled by a row-source in the form of row-vectors. Specifically, a parallel plan is built on the Query Coordinator (QC). The parallel plan is subdivided into sub-plans or sub-trees, each called a DFO (Data Flow Object), each of which are scheduled and run in parallel on a set of parallel execution slaves.

One of the main design issues in any parallel SQL execution engine is how to express and communicate these tasks or sub-plans to the parallel slave processes. According to one implementation of the row-source model, a specialized form of SQL, called slave SQL, is used to express such tasks or sub-plans. Slave SQL is standard SQL plus some extensions to support notions like data partitioning and flow of partitioned data from one DFO to another.

According to the same approach, the slave SQL, corresponding to each DFO, is sent to slaves. Upon receiving a slave SQL command, a slave compiles the slave SQL and executes the slave SQL using control information sent from the QC. The global parallel plan has a SQL cursor corresponding to each Data Flow Object (DFO). So, running a parallel query involves parsing, unparsing and executing a parallel cursor on the QC side and parsing and executing on a slave set one cursor per DFO.

When compiled by slaves, the DFO cursors expressed in slave SQL often generate special row-sources that a QC plan would never include. Given the complexity of this picture, parallel queries can be difficult to manage, monitor and tune. Also, generating slave SQL for each DFO from the physical execution plan (comprising of row-source plus some parallel annotation) is difficult and error-prone, since the compilation structures get manipulated and transformed extensively after the high level SQL gets parsed, semantic-checked, optimized and compiled into the physical row-source plan.

Parallel Execution Using a Single Curser Model

To avoid the disadvantages associated with slave SQL, techniques have been developed for executing queries, or portions thereof, in parallel without using slave SQL to communicate to each slave the operations to be performed by the slave. Instead of generating one cursor for the query coordinator (QC) based on a database statement, and separate cursors for each DFO based on the slave SQL, the techniques involve sharing a cursor among the various participants involved in the parallel execution of the operations specified in the statement. The model used by these techniques is referred to herein as the "Parallel Shared Cursor" (PSC) model of processing, in parallel, the operations specified in SQL queries. Various aspects of the Parallel Shared-Cursor model are described in detail in the patent applications identified above in the PRIORITY CLAIM/RELATED CASES section.

When using the parallel cursor model to execute, in parallel, one or more operations specified in a query, a database server must make numerous decisions that affect the overall performance of the query. For example, the database server must determine which portions of the query are to be parallelized (establish the DFOs), which slave sets are to perform which operations (the DFO-to-slave-set assignment), and which operations are to be performed by the QC itself. Further, while the slaves have access to shared cursor, the shared cursor alone does not necessarily communicate to each slave all of the information required by the slave. Thus, the database server has to determine which additional information each slave needs in order to perform its assigned work, and provide a mechanism for communicating the necessary information to each slave.

The approaches described in this section are approaches that could be pursued, but not necessarily approaches that have been previously conceived or pursued. Therefore, unless otherwise indicated, it should not be assumed that any of the approaches described in this section qualifies as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Functional Overview

Techniques are provided for processing, within a database server, a database statement, where at least one subtask required by the database statement is to be executed in parallel by a slave set that includes a plurality of slave processes. Upon receipt of the database statement, the database server determines whether the database statement includes an external expression, relative to the subtask, that (a) produces information that is required by slave processes in the slave set in order to perform the subtask, and (b) is not to be evaluated by each slave process in the slave set.

An execution plan is generated for the database statement. The portion of the execution plan that corresponds to the subtask constitutes a DFO that is assigned to the slave set. During execution of the plan, all slaves participating in executing the parallel statement use the same complete parallel execution plan. In addition, if the subplan for a DFO being executed by a slave includes column or expression values that are "external" to the DFO (i.e. not available as inputs to the DFO's plan), then such external values are generated by causing the external expressions to be evaluated, and the one or more external values are communicated to the slaves of the slave set to allow the slave processes of the slave set to perform respective portions of the subtask in parallel, without requiring each slave of the slave set to evaluate the external expression.

EXAMPLE SYSTEM

Figure 1:
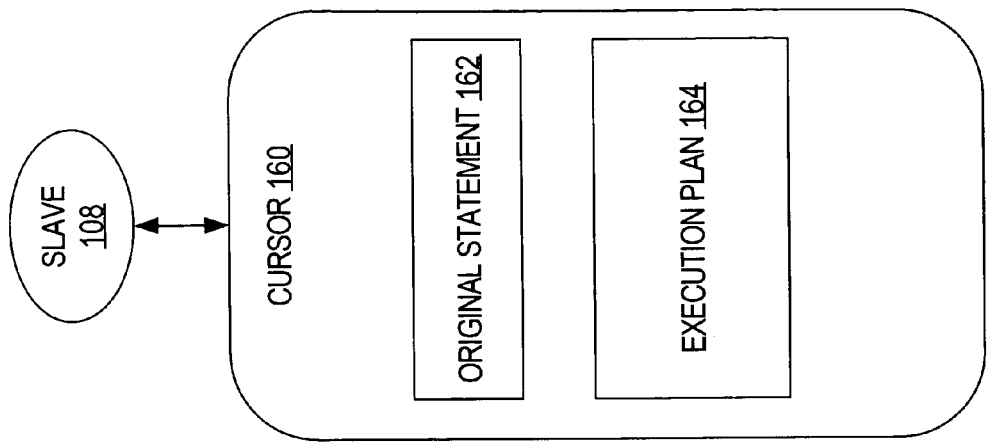
FIG. 1 is a block diagram illustrating a system in which slave processes perform work based on shared cursors and equivalent cursors, according to an embodiment of the invention.
Figure 1:
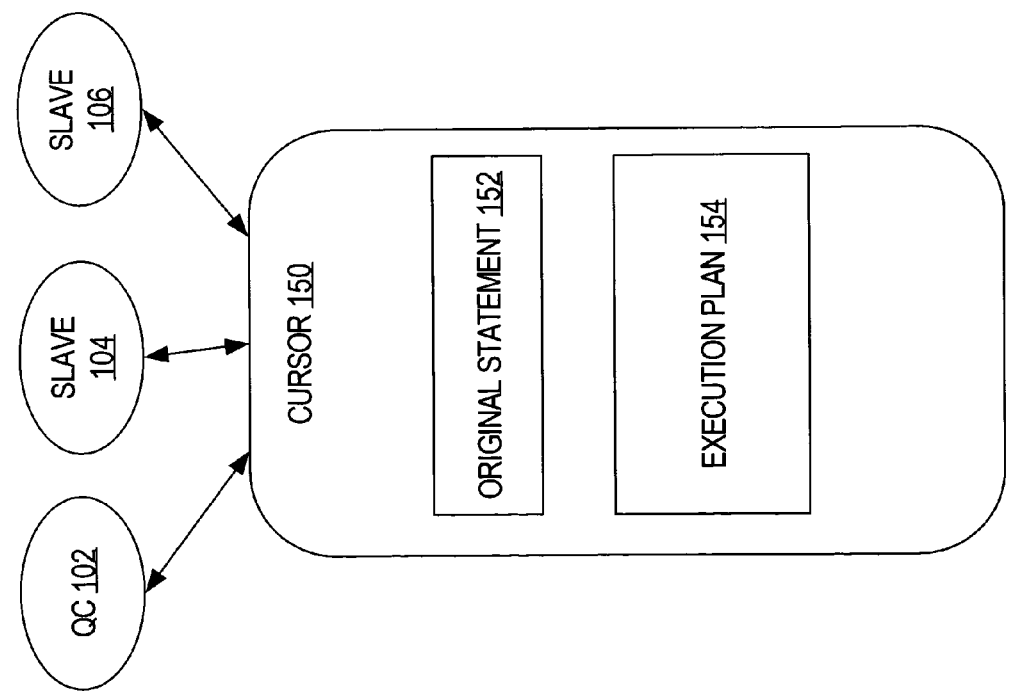

FIG. 1 is a block diagram of a system in which a single cursor is shared between several processes, according to an embodiment of the invention. Specifically, a cursor 150 has been generated by a database server based on a database statement received from a database application. In the illustrated embodiment, the cursor 150 includes the original statement 152 of the database command (typically a SQL statement) for which the cursor 150 was generated. In addition, the cursor 150 includes an execution plan 154 that describes a plan for accomplishing all of the operations specified by the original statement 152 (herein referred to as the "complete execution plan").

For the purpose of explanation, it is assumed that the database statement specifies one or more operations that can be parallelized. Consequently, the cursor 150 containing the complete execution plan is made available to a query coordinator 102 to allow the query coordinator 102 to coordinate the parallel execution of those operations.

The query coordinator 102 coordinates the parallel execution of an operation by providing to slave processes information that causes each of the slave processes to perform a portion of the parallel operation. However, the information provided to the slave processes is not in the form of slave SQL that must be separately parsed and compiled by the slave processes. Rather, as illustrated in FIG. 1, the cursor 150 that contains the execution plan 154 used by the QC is made available to the slaves. Specifically, FIG. 1 illustrates a scenario in which two slaves 104 and 106 have access to the same instance of the cursor 150 that is being used by the query coordinator, and one slave 108 that has access to a separate instance of a cursor 160 that is an equivalent of cursor 150.

Regardless of whether a slave has access to the same cursor instance as the query coordinator, or to an instance of an equivalent cursor, the slave is privy to the same information. For queries that share the same cursor instance as the query coordinator, that information is already in compiled form, thus avoiding the need for each slave set to separately parse and compile their own cursors based on SQL fragments. Further, the information available to each slave includes the complete execution plan, and is not limited to the portion of the plan that is specific to the role of that particular slave in the execution of the plan. Because the slave is exposed to this information, the slave can make intelligent decisions with respect to how to execute its portion of the plan. For example, a slave may determine how it will execute its portion of the plan based, in part, on some characteristic of the original statement. As another example, a slave may determine how it will execute its portion of the plan based, in part, on portions of the execution plan that will be executed by other slave processes.

Information Required By Slaves

According to the parallel single-cursor model (PSC) of Parallel SQL Execution, the central Query Scheduler or Query Coordinator (QC) compiles a top-level parallel cursor, and the cursor's plan is shared by the parallel execution slaves. The execution slaves then execute only the respective subtrees of the parallel execution plan that is mapped to them by the QC.

A given execution plan may have several distinct parallelizable subtrees that are to be assigned to slave sets. Each such subtree is defined by a DFO. Specifically, each DFO specifies one or more operations to be performed by a corresponding slave set. To perform the operations specified by a DFO, the slaves within the assigned slave set require certain pieces of information, including "subtask information" and "granule information".

Subtask information identifies the pieces of the parallel plan that a slave set is to perform. In the PSC model, the slaves have access to the entire execution plan. Thus, the subtask information indicates to the slaves which specific portions of the entire plan belong to the DFO that their slave set has been assigned to execute.

While all slaves within the same slave set perform the same operations, they do not all perform those same operations on the same data. Rather, the QC divides the total set of data involved in the subtask into subsets of data (called granules), and assigns different granules to different slaves within the slave set. The granule information indicates to a slave the specific granule upon which the slave is to perform the operations specified by the subtask information.

At times, the subtask information and granule information may not include all of the information that a slave requires to perform its assigned operations. Specifically, a slave may also require information that (1) is required to perform the operations that belong to a DFO, (2) is not provided in the row vector consumed by the slave set, and (3) cannot or should not be produced by the slaves that belong to the DFO. Information that falls into this category is referred to as "external information". An expression that relates to such external information is referred to herein as an "external expression".

External Expressions

In a system that supports SQL, database commands typically take the form of SQL statements. SQL statements may include subclauses, and subclauses may include external expressions. As mentioned above, external expressions are expressions that correspond to external values that are required to perform the operations that belong to a DFO, but cannot or should not be produced by the slaves that belong to the DFO. Examples of external expressions include: a column value fetched from a relation/table (e.g. column c1), a function of one or more such column values (e.g. c1+c2), or literal expressions which do not depend on a relation (e.g. SYSDATE).

According to one embodiment, external expressions are handled by having the corresponding external values produced outside the slave set, and then communicating the external values to the slaves that belong to the slave set. However, in order to handle external expressions in this manner, the database server must have a mechanism for identifying the external expressions.

Expression Analysis

In a row-source (iterator) model of SQL execution, data flows through the SQL operations modeled by a row-source in the form of row-vectors. A row source is said to "define" an expression if the row source produces a value for the expression. A row source is said to "reference" an expression if the row source consumes the value produced by the expression. Typically, row source A can consume an expression produced by row source B only if A occurs later than B in a depth-first traversal of the row source tree. Intuitively, this corresponds to a bottom-up, left-to-right evaluation of the tree—and therefore, expressions produced by earlier row sources are available for consumption by later row sources.

According to one embodiment that uses the row-source model of SQL execution, an expression analysis service is used to identify external expressions by requiring all row-sources (iterators) to register their use of expressions. During the analysis phase, the definition for every expression is identified. According to one embodiment, any expression that does not have a definition in the DFO that contains it is considered to be an external expression (i.e. its value is produced by a different piece).

Specifically, expressions in different DFOs are not visible to each other except through the row vector of the root of the piece/DFO. Consequently, during the analysis phase, an expression is considered an external expression relative to a particular DFO if the expression (1) is used by the particular DFO, but (2) does not have a definition in the particular DFO.

According to one embodiment, the expression analysis module also identifies certain other kinds of expressions as external expressions, for reasons of consistency (e.g. expressions that depend on the environment—SYSDATE, CURRENT_TIME etc), or for performance (e.g. expressions of certain types of subqueries).

Thus, in some cases, external expressions cannot be evaluated in a DFO that uses the corresponding values because their values are not generated in the DFO or are not part of the input row-vectors of the DFO. In others cases, external expressions can be evaluated in the DFO, but doing so would be either extremely expensive (e.g. in the cases of a single set subquery) or incorrect (e.g. where the value is dependant on the evaluation context).

In the following sections, various examples are provided of queries and query plans where external expression values are required by a parallel slave.

External Expression Example #1

The following query Q1 is an example of a query that includes an indexed nested loop join:
SELECT /*+USE_INDEX(t2, ind2) ORDERED PARALLEL(ind2, 2) */ t1.c1, t2.c2
FROM t1, t2
WHERE t1.c1>t2.c2

The database server may determine that the index scan should be performed in parallel. Consequently, the resulting execution plan (EP1) for Q1 may have a parallel right-hand-side (RHS), as illustrated below:

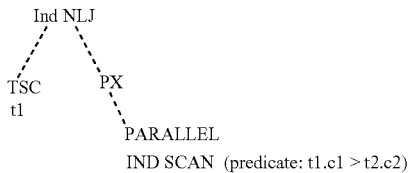

For each probe into the parallel DFO on the RHS, the join predicate to be evaluated on the slave will need the value of t1.c1 for that respective probing row. Since the slave set that is performing the index scan does not produce the t1.c1 value for the probing row, the t1.c1 value is an external value that must be provided to the members of the slave set that are performing the parallel index scan. According to one embodiment, the QC (running the parallel row-source PX) sends the value of t1.c1 to each slave onto which the IND SCAN DFO has been mapped to run.

External Expression Example #2

The following query (Q2) is a filter query with a correlated subquery:
SELECT /*+NOPARALLEL(t1) */ t1.c1
FROM t1
WHERE t1.c1>(SELECT /*+NO_UNNEST PARALLEL(t2 2) */ t2.c2 FROM t2 WHERE t2.c3=t1.c3)

The database server may determine that the scan of the subquery should be performed in parallel. Consequently, the resulting execution plan (EP2) for Q2 may have a parallel right-hand-side (RHS), as illustrated below:

In this example, the slaves that execute the parallel TSC DFO require the value of correlated column t1.c3. However, the TSC DFO does not produce the t1.c3 value. Consequently, t1.c3 is an external value relative to the parallel TSC DFO. According to one embodiment, the QC (running the PX row source) sends the value of correlated column t1.c3 for each row coming from t1 to each slave executing the parallel TSC DFO.

External Expression Example #3

Nested table values may be stored in a two-table model with a primary key-foreign key relationship. Typically, the child table (also known as the storage table) stores the values of the nested table elements. In addition, each row of the storage table has a NESTED_TABLE_ID column—which is logically the foreign key to the parent table. The parent table maintains a hidden column (the equivalent of the storage table's NESTED TABLE ID column) for each row. All rows of the storage table with the same NESTED_TABLE_ID value correspond to the elements of a single nested table value.

The following query (Q3) is an example of a query that selects a nested table column (nt) from a table (t1):
SELECT /*+NOPARALLEL(t1) */ t1.nt
FROM t1

Selecting the nested table value involves looking up the hidden column from the parent table, and using the value from the hidden column to identify the set of rows of the storage table that have this value for the NESTED_TABLE_ID column. Thus, the database server may generate the following execution plan (EP3) for Q3:

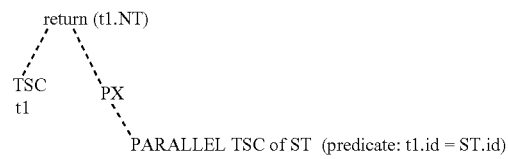

The values from the hidden column of the parent table are external values relative to the parallel TSC DFO for the storage table. Thus, according to one embodiment, the QC sends the value of the hidden column from the parent table row to the slaves executing the parallel TSC DFO for the storage table. Specifically, for each row of t1, the QC sends the value of the hidden column id to the slaves scanning ST.

External Expression Example #4

In the previous examples, the slaves assigned to a DFO required information that is not produced within the DFO. However, even when the required information can be generated within the DFO, there are situations where the information should be provided from a source external to the DFO to ensure correct results. Such situations include, for example, situations in which the evaluation of an expression depends on the environment at the time at which the expression is evaluated.

For example, if each slave in a slave set independently evaluated certain literals, like SYSDATE and USERENV, the values produced by the various evaluations may differ. If the slaves perform their work based on different values for such literals, the result may not be correct. For example, the following query (Q4) uses the SYSDATE literal:
SELECT /*+PARALLEL(t1) */ c1, c2, cdate
from t1
where cdate>SYSDATE;

If each of the slaves scanning t1 independently evaluates SYSDATE, then the SYSDATE value used by the slaves may vary depending on (1) the node on which the slave is executing, and (2) the time at which the slave evaluates SYSDATE. In order for all of the slaves to work with the same SYSDATE value, SYSDATE is evaluated once, and only on the QC (i.e. the serial top-level process executing the SQL statement submitted by the client to the DBMS server), and the resulting value is provided to each of the slaves. According to one embodiment, the value of SYSDATE is evaluated on the QC, and is sent from the QC to the slaves scanning t1.

External Expression Example #5

In the previous examples, the slaves assigned to a DFO required information that either (1) is not produced within the DFO, or (2) must be evaluated once for all slaves in order to achieve correct results. However, even when correct results would result by having each of the slaves generate the required information, there are situations where, for performance reasons, the information should not be separately generated by each of the slaves. Specifically, if the generated information would be the same every time the expression is evaluated, then the information can be generated once, and then sent to each slave that requires the information. By generating the information only once, the computational resources consumed by the slaves is reduced. The greater the computational cost of generating the information, the greater the resources saved by performing the computation only once.

For example, the following query (Q5) includes a scalar subquery that can be evaluated once and for all, and the value sent over to the slaves to prevent the subquery from being evaluated on each slave:
UPDATE /*+PARALLEL(t1) */ t1
set sum_sal=sum_sal+
(select /*+PARALLEL(t2, t3) */ sum(t2.sal)
from<complex subquery involving t2, t3 . . . . >>);

In query Q5, the complex parallel subquery computing the single-value sum(t2.sal) can be evaluated on the QC, and the value sent over to the slaves performing the parallel update of table t1. If instead the scalar subquery was evaluated on each slave, the subquery would have to be executed serially on each slave and could lead to significant degradation in performance of the parallel update statement.

In another embodiment, the scalar subquery computing the aggregate sum(t2.sal) could be independently parallelized using a second slave group (with two slave sets). These two slave sets could compute and send the partial aggregates to the QC, which would compute the final aggregate value, and then communicate the value over to the slave set executing the parallel update.

Communicating External Values

According to one embodiment, external expressions are identified at the time a query is analyzed. However, the values for external expressions are not generated until execution time. Specifically, according to one embodiment, the external values of all such EXTERNAL expressions are computed at execution time on the QC, and sent over to the slaves as part of the execution message. The slaves take out each value from the execution message, copy the value into the buffer of the operand (which is the internal representation of the expression for the SQL engine) and are thus able to correctly execute a fetch on the relevant DFO's row-source tree.

While embodiments have been described in which the external expression is evaluated by the QC, the techniques herein are not limited to such embodiments. For example, in the case of a correlated parallel sub-query, the values can be generated from another parallel slave group. So long as a central dispatching point propagates the external values to the other slaves that require the external values, any process or group of processes may actually generate the external values.

According to an alternative embodiment, a different propagation mechanism can be designed to avoid the need to go back to the QC. Any shared structure can be used, such as a lock or a queue. An embodiment that communicates the external values using messaging between the slaves to the QC adds some flexibility relative to where the external expressions can be evaluated and when the external values can be propagated.

Hardware Overview

Figure 2:
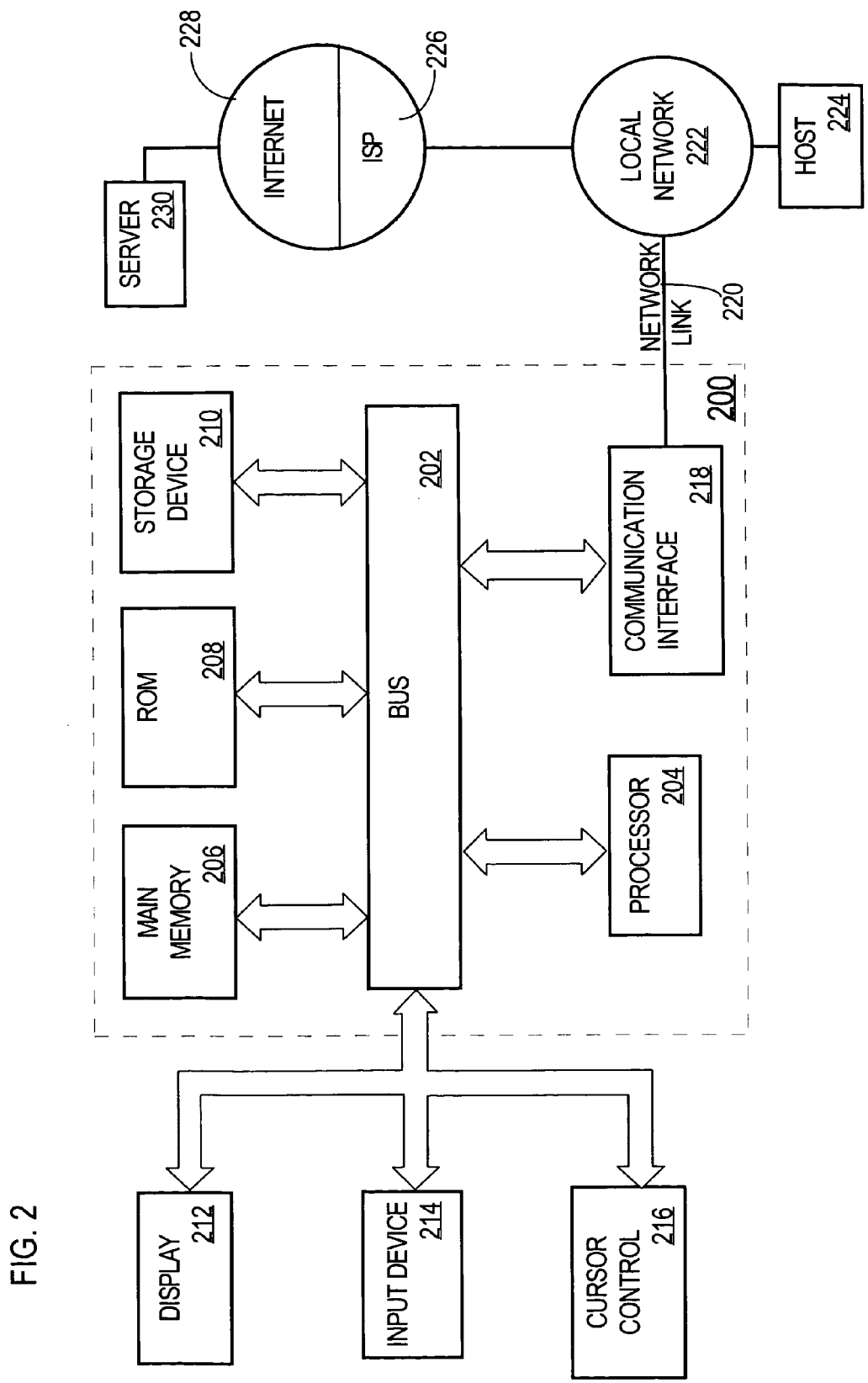
FIG. 2 is a block diagram illustrating a computer system upon which embodiments of the invention may be implemented.

FIG. 2 is a block diagram that illustrates a computer system 200 upon which an embodiment of the invention may be implemented. Computer system 200 includes a bus 202 or other communication mechanism for communicating information, and a processor 204 coupled with bus 202 for processing information. Computer system 200 also includes a main memory 206, such as a random access memory (RAM) or other dynamic storage device, coupled to bus 202 for storing information and instructions to be executed by processor 204. Main memory 206 also may be used for storing temporary variables or other intermediate information during execution of instructions to be executed by processor 204. Computer system 200 further includes a read only memory (ROM) 208 or other static storage device coupled to bus 202 for storing static information and instructions for processor 204. A storage device 210, such as a magnetic disk or optical disk, is provided and coupled to bus 202 for storing information and instructions.

Computer system 200 may be coupled via bus 202 to a display 212, such as a cathode ray tube (CRT), for displaying information to a computer user. An input device 214, including alphanumeric and other keys, is coupled to bus 202 for communicating information and command selections to processor 204. Another type of user input device is cursor control 216, such as a mouse, a trackball, or cursor direction keys for communicating direction information and command selections to processor 204 and for controlling cursor movement on display 212. This input device typically has two degrees of freedom in two axes, a first axis (e.g., x) and a second axis (e.g., y), that allows the device to specify positions in a plane.

The invention is related to the use of computer system 200 for implementing the techniques described herein. According to one embodiment of the invention, those techniques are performed by computer system 200 in response to processor 204 executing one or more sequences of one or more instructions contained in main memory 206. Such instructions may be read into main memory 206 from another machine-readable medium, such as storage device 210. Execution of the sequences of instructions contained in main memory 206 causes processor 204 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 200, various machine-readable media are involved, for example, in providing instructions to processor 204 for execution. Such a medium may take many forms, including but not limited to, non-volatile media, volatile media, and transmission media. Non-volatile media includes, for example, optical or magnetic disks, such as storage device 210. Volatile media includes dynamic memory, such as main memory 206. Transmission media includes coaxial cables, copper wire and fiber optics, including the wires that comprise bus 202. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 204 for execution. For example, the instructions may initially be carried on a magnetic disk of a remote computer. The remote computer can load the instructions into its dynamic memory and send the instructions over a telephone line using a modem. A modem local to computer system 200 can receive the data on the telephone line and use an infra-red transmitter to convert the data to an infra-red signal. An infra-red detector can receive the data carried in the infra-red signal and appropriate circuitry can place the data on bus 202. Bus 202 carries the data to main memory 206, from which processor 204 retrieves and executes the instructions. The instructions received by main memory 206 may optionally be stored on storage device 210 either before or after execution by processor 204.

Computer system 200 also includes a communication interface 218 coupled to bus 202. Communication interface 218 provides a two-way data communication coupling to a network link 220 that is connected to a local network 222. For example, communication interface 218 may be an integrated services digital network (ISDN) card or a modem to provide a data communication connection to a corresponding type of telephone line. As another example, communication interface 218 may be a local area network (LAN) card to provide a data communication connection to a compatible LAN. Wireless links may also be implemented. In any such implementation, communication interface 218 sends and receives electrical, electromagnetic or optical signals that carry digital data streams representing various types of information.

Network link 220 typically provides data communication through one or more networks to other data devices. For example, network link 220 may provide a connection through local network 222 to a host computer 224 or to data equipment operated by an Internet Service Provider (ISP) 226. ISP 226 in turn provides data communication services through the world wide packet data communication network now commonly referred to as the "Internet" 228. Local network 222 and Internet 228 both use electrical, electromagnetic or optical signals that carry digital data streams. The signals through the various networks and the signals on network link 220 and through communication interface 218, which carry the digital data to and from computer system 200, are exemplary forms of carrier waves transporting the information.

Computer system 200 can send messages and receive data, including program code, through the network(s), network link 220 and communication interface 218. In the Internet example, a server 230 might transmit a requested code for an application program through Internet 228, ISP 226, local network 222 and communication interface 218.

The received code may be executed by processor 204 as it is received, and/or stored in storage device 210, or other non-volatile storage for later execution. In this manner, computer system 200 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for processing, within a database server, a database statement, the method comprising the steps of:
   determining that at least one subtask required by the database statement should be executed in parallel by a slave set that includes a plurality of slave processes;
   determining whether the database statement includes an external expression, relative to the subtask, that (a) produces information that is required by slave processes in the slave set in order to perform the subtask, and (b) is not to be evaluated by each slave process in the slave set;
   generating an execution plan for the database statement;
   associating the execution plan with a cursor;
   providing, to each slave process of said slave set, access to either the cursor or an equivalent cursor;
   if the database statement includes an external expression, then performing the steps of generating one or more external values by causing the external expression to be evaluated; and
   communicating the one or more external values to slave processes in the slave set to allow the slave processes of the slave set to perform respective portions of the subtask in parallel without requiring each slave of the slave set to evaluate the external expression.

2. The method of claim 1 wherein:
   execution of the database statement is coordinated by a query coordinator;
   the external expression is evaluated by the query coordinator; and
   the one or more external values are communicated to the slave processes in the slave set by the query coordinator.

3. The method of claim 2 wherein the query coordinator assigns the subtask to the slave set, and then sends the one or more external values needed by the subtask every time the subtask is executed.

4. The method of claim 1 wherein the one or more values are values that (a) are produced by another subtask of the execution plan, and (b) are not included in a row vector consumed by said slave set.

5. The method of claim 4 wherein the one or more values are values used by the slave set to probe an index.

6. The method of claim 4 wherein the one or more values are values from a correlated column.

7. The method of claim 1 wherein:
the database statement specifies an operation that involves a nested table belonging to a column of a parent table;
the subtask involves scanning the nested table; and
the one or more values are values from a hidden column of the parent table.

8. The method of claim 1 wherein the external expression is an expression that produces one or more values that depend on an aspect of an environment in which the external expression is evaluated.

9. The method of claim 8 wherein the external expression involves an environmental variable.

10. The method of claim 8 wherein the external expression produces one or more values that may vary based on when the external expression is evaluated.

11. The method of claim 8 wherein:
a plurality of nodes are involved in execution of the database statement; and
the external expression produces one or more values that may vary based on which node, of the plurality of nodes, evaluates the external expression.

12. The method of claim 1 wherein the external expression is an expression which:
can be executed by each slave in the slave set; and
if executed by each slave in the slave set, would produce correct results.

13. The method of claim 12 wherein the external expression is evaluated only once to produce a result that is communicated to each slave process in the slave set.

14. The method of claim 13 wherein the external expression involves a scalar subquery of the database statement.

15. The method of claim 1 wherein the step of determining whether the database statement includes an external expression includes the step of registering information that indicates:
which expressions are defined in which row sources in the execution plan; and
which expressions are referenced in which row sources in the execution plan.

16. A computer-readable storage medium carrying one or more sequences of instructions which, when executed by one or more processors, causes the one or more processors to perform the method recited in claim 1.

17. A computer-readable storage medium carrying one or more sequences of instructions which, when executed by one or more processors, causes the one or more processors to perform the method recited in claim 2.

18. A computer-readable storage medium carrying one or more sequences of instructions which, when executed by one or more processors, causes the one or more processors to perform the method recited in claim 3.

19. A computer-readable storage medium carrying one or more sequences of instructions which, when executed by one or more processors, causes the one or more processors to perform the method recited in claim 4.

20. A computer-readable storage medium carrying one or more sequences of instructions which, when executed by one or more processors, causes the one or more processors to perform the method recited in claim 5.

21. A computer-readable storage medium carrying one or more sequences of instructions which, when executed by one or more processors, causes the one or more processors to perform the method recited in claim 6.

22. A computer-readable storage medium carrying one or more sequences of instructions which, when executed by one or more processors, causes the one or more processors to perform the method recited in claim 7.

23. A computer-readable storage medium carrying one or more sequences of instructions which, when executed by one or more processors, causes the one or more processors to perform the method recited in claim 8.

24. A computer-readable storage medium carrying one or more sequences of instructions which, when executed by one or more processors, causes the one or more processors to perform the method recited in claim 9.

25. A computer-readable storage medium carrying one or more sequences of instructions which, when executed by one or more processors, causes the one or more processors to perform the method recited in claim 10.

26. A computer-readable storage medium carrying one or more sequences of instructions which, when executed by one or more processors, causes the one or more processors to perform the method recited in claim 11.

27. A computer-readable storage medium carrying one or more sequences of instructions which, when executed by one or more processors, causes the one or more processors to perform the method recited in claim 12.

28. A computer-readable storage medium carrying one or more sequences of instructions which, when executed by one or more processors, causes the one or more processors to perform the method recited in claim 13.

29. A computer-readable storage medium carrying one or more sequences of instructions which, when executed by one or more processors, causes the one or more processors to perform the method recited in claim 14.

30. A computer-readable storage medium carrying one or more sequences of instructions which, when executed by one or more processors, causes the one or more processors to perform the method recited in claim 15.

* * * * *